*Smith & Mitchell,*
*Clothes Sprinkler.*
No. 99,021.　　　　　　　Patented Jan. 18, 1870.
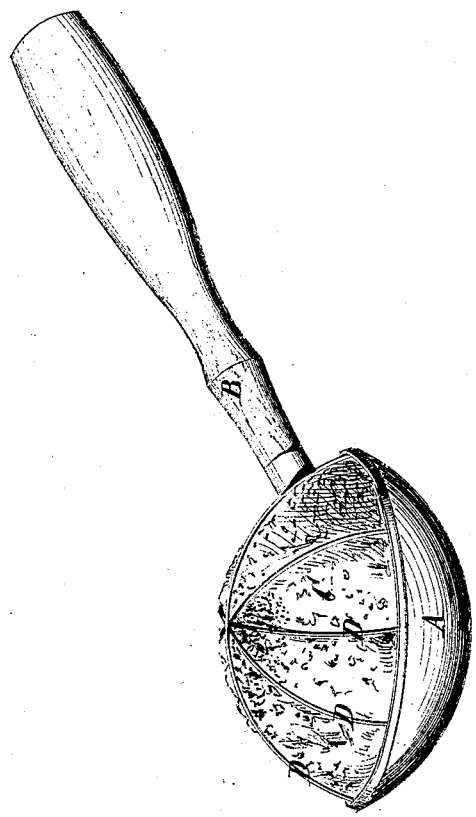
Witnesses:　　　　　　　　Inventor:

United States Patent Office.

T. RICE SMITH AND JAMES MITCHELL, OF JACKSONVILLE, ILLINOIS.

Letters Patent No. 99,021, dated January 18, 1870.

IMPROVED CLOTHES-SPRINKLER.

The Schedule referred to in these Letters Patent and making part of the same

*To all whom it may concern:*

Be it known that we, T. RICE SMITH and JAMES MITCHELL, of Jacksonville, in the county of Morgan, and State of Illinois, have invented a new and improved Clothes-Sprinkler; and we do hereby declare that the following is a full, clear, and exact description thereof, which will enable others skilled in the art to make and use the same, reference being had to the accompanying drawing, forming part of this specification.

This invention relates to improvements in sprinklers for sprinkling clothes, floors, carpets, windows, &c.; and It consists in the combination, with a metal or other cup or dish, provided with a suitable handle, of a sponge, confined in the said dish by wires, attached to the edge of the dish, and bent over the sponge; or a holder, made wholly of wire, and provided with a handle, may be used in substitution of the dish.

The drawing represents a perspective view of our improved sprinkler.

A is a cup, of tin, copper, or other non-corrosive metal, and B, a handle, of wood or other suitable substance attached to it.

C is a piece of sponge, confined in the said cup by wires, D, attached to the edge of the cup, and bent in oval form from side to side.

This sprinkler is used by plunging it in water, to saturate the sponge, and swinging it by the hand in a jerking manner, to eject the water upon the clothes or other article to be sprinkled.

Instead of using the cup, we may employ a basket or frame for holding the sponge, made wholly of wire, which will answer a good purpose; but we prefer to use the cup, as it will prevent the escape of water from the lower side, on the table or other article, when laid down.

Having thus described our invention,

We claim as new, and desire to secure by Letters Patent—

A clothes-sprinkler, consisting of a cup or basket, of sheet-metal or other substance, and sponge, confined therein by wires, or otherwise, the said cup being made with a suitable handle, all substantially as specified.

T. RICE SMITH.
JAMES MITCHELL.

Witnesses:
T. G. TAYLOR,
JOHN KILIAN,
DR. HAMILTON.